(12) United States Patent
Herman

(10) Patent No.: US 11,490,029 B2
(45) Date of Patent: Nov. 1, 2022

(54) VEHICLE VISION LED FLICKER INTERFERENCE MITIGATION SYSTEM

(71) Applicant: Ford Global Technologies, LLC, Dearborn, MI (US)

(72) Inventor: David Herman, Oak Park, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 105 days.

(21) Appl. No.: 17/085,651

(22) Filed: Oct. 30, 2020

(65) Prior Publication Data

US 2022/0141375 A1    May 5, 2022

(51) Int. Cl.
*H04N 5/235* (2006.01)
*H04W 4/40* (2018.01)

(52) U.S. Cl.
CPC ......... *H04N 5/2357* (2013.01); *H04N 5/2355* (2013.01); *H04W 4/40* (2018.02)

(58) Field of Classification Search
None
See application file for complete search history.

(56) References Cited

U.S. PATENT DOCUMENTS

| | | | |
|---|---|---|---|
| 2019/0208106 | A1 | 7/2019 | Lukac |
| 2019/0248281 | A1 | 8/2019 | Fushimi et al. |
| 2019/0394385 | A1* | 12/2019 | Osawa ............ H04N 5/232061 |
| 2021/0014402 | A1* | 1/2021 | Nossek ............... H04N 5/2353 |

FOREIGN PATENT DOCUMENTS

WO    WO-2021074122 A1 *    4/2021

OTHER PUBLICATIONS

Brian Deegan et al., "LED Flicker: Root causes, impact and measurement for automotive imaging applications," Society for Imaging Science and Technology, IS&T Symposium on Electronic Imaging, Autonomous Vehicles and Machines Conference, 2018, Galway, Ireland, 6 pages.
Omnivision Technologies, "OmniVision's LED Flicker Mitigation (LFM) Imaging Solution", Oct. 16, 2018, 2 pages.

* cited by examiner

*Primary Examiner* — Quan Pham
(74) *Attorney, Agent, or Firm* — Frank Lollo; Eversheds Sutherland (US) LLP

(57) ABSTRACT

A light emitting diode (LED) flicker mitigation system disposed on a vehicle captures multiple images of an exterior scene to determine whether a light that appears to be off is actually off, or whether the state of the light is actually on but erroneously shown in the system image captures as off due to temporal aliasing. The LED flicker mitigation system may obtain information from external infrastructure and contact other vehicles proximate to the captured scene to determine the true state of the LED light source by identifying homography using the vehicle image captures, infrastructure information, and vehicle sensors. The images may be shared amongst the vehicles to correctly determine the LED status and correct any erroneous LED state information.

20 Claims, 5 Drawing Sheets

VEHICLE VISION LED FLICKER INTERFERENCE MITIGATION SYSTEM

TECHNICAL FIELD

The present disclosure relates to machine vision systems, and more particularly, to a light emitting diode (LED) flicker mitigation system.

BACKGROUND

LED flicker is a type of aliasing that occurs when a camera captures multiple image frames or sequential rows of an image frame over some time duration at a rate that coincides with the operational frequency, e.g. pulse width modulation mode of operation, of the LED or other light source. LED flicker may present a particular challenge for Advanced Driver Assist Systems (ADAS) and Autonomous Vehicle (AV) systems if the vehicle perception system is unable to recognize an accurate state (light on or light off) of traffic signal lights. LED flicker can cause the vehicle perception system to misinterpret turn signals due to ambiguity of the state of the LED signal, or miss warning lights that could indicate a hazard, emergency, or a failure mode.

Some conventional approaches to solving the problem of LED flicker have focused on the use of new hardware solutions such as LOFIC (lateral overflow integration capacitor), image processing solutions such as chopping (adding components to filter the image signal), and image capture strategies such as split pixel imaging that captures an image of a scene simultaneously instead of sequentially. While some systems may increase the probability of accurately characterizing the present state of an LED, these mitigating methods may increase the complexity of vehicle perception systems, and may raise vehicle cost. Moreover, conventional LED flicker mitigation systems may have other drawbacks, such as a reduction in dynamic range, and appearance of other artifacts such as non-continuous intensity (pulsing) in the images.

It is with respect to these and other considerations that the disclosure made herein is presented.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Elements and/or components in the figure may be sub-elements, sub-components, sub-sub-elements, sub-sub-components, etc. of elements and/or components in other figures. Throughout this disclosure, depending on the context, singular and plural terminology may be used interchangeably.

DETAILED DESCRIPTION

Overview

Figure 1:
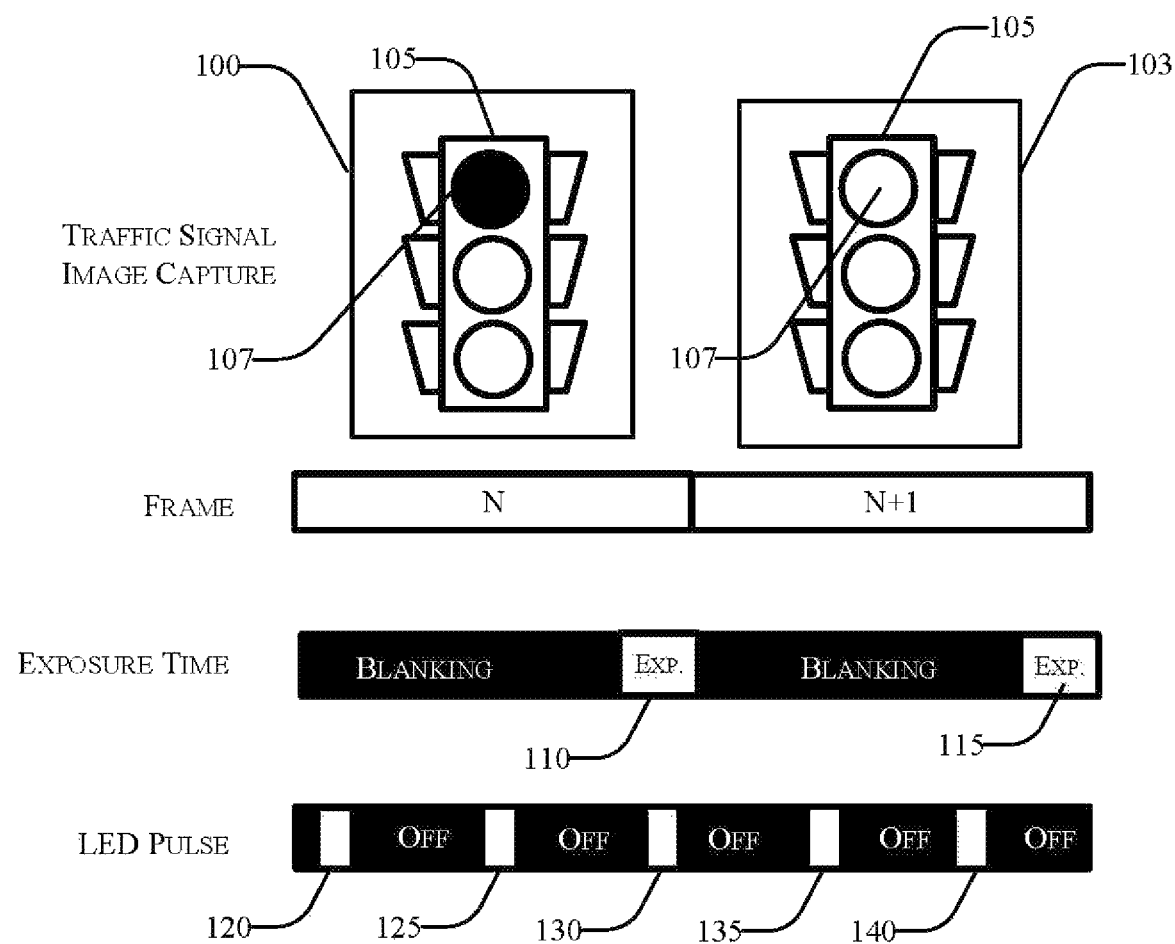
FIG. 1 illustrates an example of LED flicker in a traffic signal light as observed by a conventional vehicle vision system.

The systems and methods disclosed herein are configured and/or programmed to mitigate light emitting diode (LED) or sequential rows of an image frame over some time duration at a rate that coincides with the operational frequency, e.g. pulse width modulation mode of operation, of the LED or other light source. flicker in a vehicle vision system. The LED flicker mitigation system may identify vehicle vision system image data, which may include images and/or image sequences, that may detecting other vehicle trajectories when approaching traffic signal which may not be detected from other image systems due to LED flicker interference that may erroneously depict the state of traffic signal LEDs, or other LED lights. The LEDs may be associated with traffic lights, other vehicles on the road, and/or other infrastructure. In some aspects, the LEDs may be signaling, aesthetic, illuminating or other types of signals. In most cases, the LED interference can cause read and interpretation errors in vehicle systems based on, at least in part, what is and is not seen, and how the interpretation error affects perception and planning of vehicle systems. Embodiments of the present disclosure may detect LED flicker from senor, senor fusion, V2X communication discrepancies, and/or detect attempted V2X spoof attacks. For example, a bad actor may attempt to spoof the traffic light sensor in attempt to manipulate vehicle perception of the traffic signal.

According to an embodiment, a LED flicker mitigation system may be disposed on a vehicle and configured to capture multiple images of an external scene using a vehicle perception system. The LED flicker mitigation system evaluates the captured images to determine whether a light that appears to be off is actually off, or whether the state of the external light is actually light on, but erroneously shown in the image captures as being off due to temporal aliasing. The LED flicker mitigation system may contact another vehicle proximate to the captured scene using vehicle-to-vehicle communication, and/or obtain information from external infrastructure, to determine the true state of the external LED light source. Using the analyzed image capture information, the LED flicker mitigation system may identify homography and localization of ego and other vehicle (e.g. via v2x) based on the vehicle image captures, and further based on the image capture timing information received from a second vehicle.

In one embodiment, to obtain the second vehicle's information, the LED flicker mitigation system may request image capture information from the second vehicle by coordinating imaging time periods or exposure properties between vehicle vision systems of two or more vehicles using vehicle-to-vehicle wireless communication protocols. The system can use the LED flicker mitigation system to identify jointly observed light emitting from the LED light source, which may increase the probability of imaging the light source when the LED is active and detect the operating frequency and offset of the LED. The images may be shared amongst the vehicles to correctly determine the LED status and correct any erroneous LED state information.

These and other advantages of the present disclosure are provided in greater detail herein.

Illustrative Embodiments

The disclosure will be described more fully hereinafter with reference to the accompanying drawings, in which example embodiments of the disclosure are shown, and not intended to be limiting.

FIG. 1 illustrates an example of LED flicker in a traffic signal light 105 observed by a conventional vehicle vision system. Although many signal lights, signs, and other indicia may include an array of LEDs disposed in a synchronized grouping (e.g., the round signal light), it should be appreciated that the present disclosure may describe groupings of LEDs in the singular.

In some instances, the vision system may be independent of the vehicle. For example, vision system may be part of a phone/camera of a mobile device that is brought into a vehicle. That is, the systems and methods described herein can apply to portable camera devices, such as mobile devices, smartphones, wearables, etc.

The example depicted in FIG. 1 illustrates two successive image captures 100 and 103, respectively, where an LED 107 is shown in successive image captures 100 and 103, with an inconsistent LED state (e.g., light on, then light off) appearing in successive time sequenced images, although the LED 107 appears to be continuously illuminated if observed by a human observer (not shown in FIG. 1). The LED 107 appears to be light on in the image 100, however, in the subsequent image capture 103, the LED 107 appears to be off. The image capture 100 corresponds with an image frame N, and the image capture 103 corresponds with a consecutive image frame N+1. In frame N depicted in the image capture 100, the traffic light 105 is visually observable by a human as being light on. However, in frame N+1, depicted in the successive image capture 103, the same LED 107, while still visually observable by the human observer as being light on, is observed or read by the vehicle perception system (that obtained both successive image captures 100 and 103) as an image depicting the LED 107 being in an off state. In some instances, the camera perception system of a vehicle (not shown in FIG. 1) may operate at 30-60 frames per second, as illustrated in FIG. 1 as Exposure Time, where the exposures are periodic at a particular frequency, with blanking (i.e., no images taken) between the exposures. In the example shown, the image capture 100 corresponds to an exposure 110, and the image capture 103 corresponds to the exposure 115.

An infrastructure (not shown in FIG. 1) can include city power sources that power LED traffic signal systems. The traffic light 105 is one such example of a light operating as part of an infrastructure. The power sources that power the LED traffic signal systems operate at a particular frequency, which may be inconsistent from light to light (depending on operating parameters and equipment), and location to location (depending on the operating frequency of the power grid). LED flicker may occur when some frames of an image capture system capture the scene at a moment (e.g., the image capture 100 at Frame N) that corresponds to an active LED pulse (e.g., an LED pulse 130) emanating from the power system infrastructure. In FIG. 1, a graph of LED pulses depicts amplitude LED pulses 120, 125, 130, 135, and 140. Each of the LED pulses 120-140 correspond to a high amplitude power pulse operating at a frequency associated with the infrastructure and/or light hardware. As the LED 107 operates within the infrastructure, what appears to be a continuously illuminated light to the human observer may actually be the example series of high amplitude LED pulses 120-140 that intermittently illuminate the LED 107 at each respective pulse, and emit no light in the off portions intervening the LED pulses 120-140.

Conventional vehicle perception systems may capture the LED during a high amplitude pulse (e.g., the LED pulse 130 at frame N) which results in the image capture 100 showing that the LED 107 is light on. When the image capture 103 is taken by the vehicle perception system at the next consecutive image frame N+1, the exposure time may not correspond to a LED pulse, as demonstrated in the image capture 103, where the LED 107 appears to be in an off state due to inconsistent sequencing between the infrastructure LED pulsing and the image capture system exposure timing of the vehicle perception system. This result is LED flicker. Other types of image capture corruption are also possible and frequently experienced, including a flashing light effect, and a partially visible light effect, among others.

Figure 2:
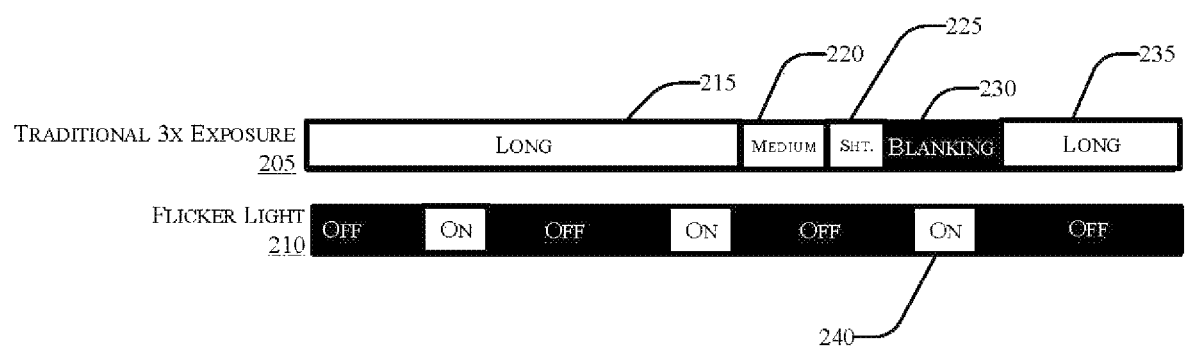
FIG. 2 depicts a conventional approach to mitigating LED flicker where pulsing is observed.

One conventional approach to flicker mitigation is increasing and/or decreasing vehicle perception system capture times by varying a temporal offset time for the image captures to decrease the appearance of aliasing-based artifacts such as LED flicker. FIG. 2 depicts one conventional approach to mitigating LED flicker where LED pulsing is observed, which may appear to a vehicle perception system as a light being off, or a flashing light effect. Systems similar to the system depicted in FIG. 2 may result in temporal averaging of the flicker, but not total removal. This may result in a slow intensity modulation, but not on and off. Accordingly, conventional solutions like the system of FIG. 2 may not be ideal for scenarios for detection under challenging conditions.

Figure 3:
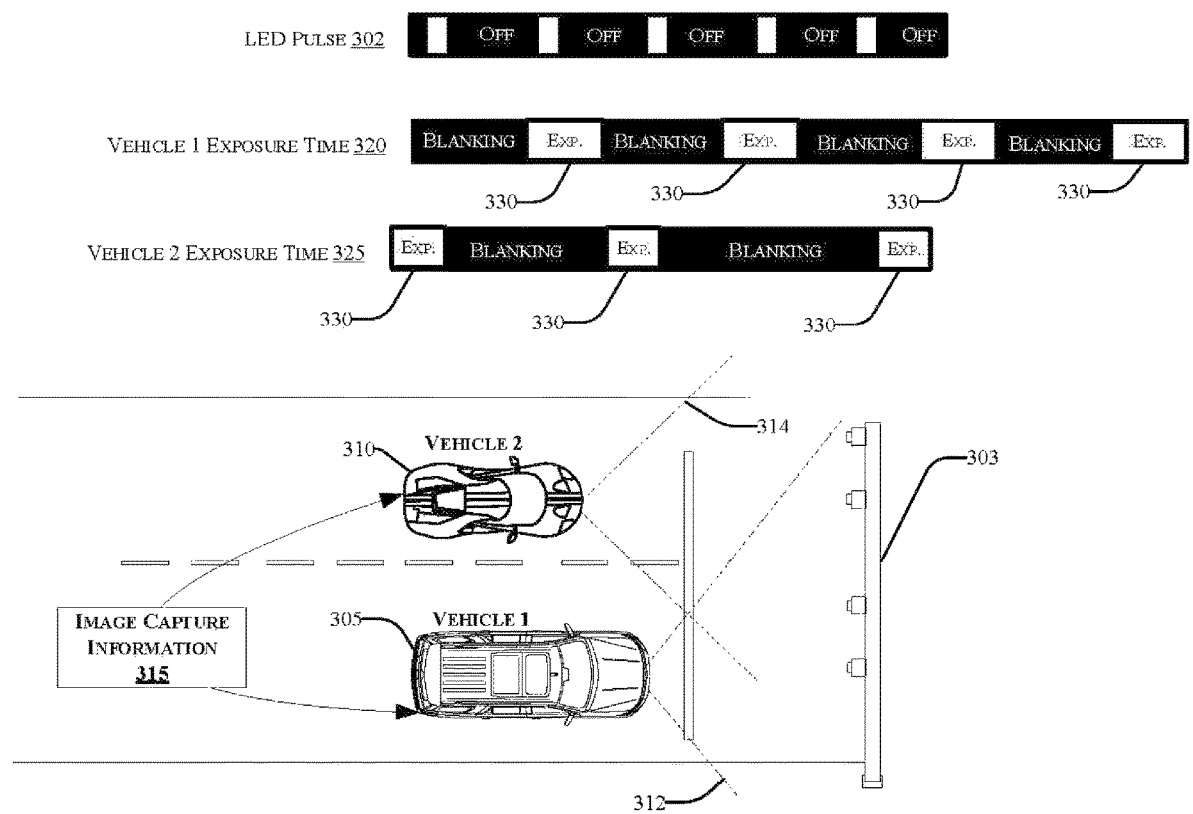
FIG. 3 depicts two vehicles and communication of image capture information using a LED flicker mitigation system according to embodiments of the present disclosure.

As depicted in this example of a conventional vehicle vision system, the offset shift and exposure duration 205 may be varied. For example, a long exposure time 215 may be followed by a medium offset 220, a short offset 225, and a blanking portion 230. By varying the offset times and exposure lengths 215-235, the pulses 240 shown in the flicker light graphic 210 may appear in all exposures except the exposure 240 appearing contemporaneously with the blanking portion 230 (and similar periods that may not be shown in FIG. 2). Conventional solutions may result in temporal averaging of the flicker but not total removal. Such systems may result in a slow intensity modulation but not on and off resulting in a decrease in the signal to noise (SNR) of the detection thereby reducing the accuracy of perception systems. Other temporal shifting patterns may be used in conventional systems, which may include increased or decreased exposure times, which may (at least in the case of increased exposure times) mitigate flicker artifacts in the image captures. However, by increasing exposure time, the bright ambient light may reduce image quality (e.g., during a sunny day). Other drawbacks may include only partial correction of flicker and complications in multiple exposures high dynamic range motion artifacts FIG. 3 depicts two vehicles 305 and 310 communicating image capture information 315 using a LED flicker mitigation system (e.g., a system 407 as shown with respect to FIG. 4), according to embodiments of the present disclosure. Both of the vehicles 305 and 310 may include V2X communication capabilities, and may further include LED flicker mitigation systems.

A vehicle under bright lighting conditions may use a relatively short exposure time to avoid over exposure of the image captures. As demonstrated with respect to FIGS. 1 and 2, shorter exposure times may increase the probability of missing some or all of the LEDs in the on state, which may vary based on a number of factors such as the exposure time, the frame-to-frame time gap, temporal offsets, LED frequency, LED electrical parameters, CMOS rolling shutter parameters, etc.). A vehicle may have control over its own imaging mode but may not be able to sample all of the frequency and temporal offset spaces necessary to mitigate the probability of LED flicker in the image captures under some time constraints, e.g. while approaching a traffic light at some velocity.

According to an embodiment, a first vehicle 305 may contact one or more other vehicles, such as a second vehicle 310, using vehicle-to-vehicle communication technologies, and collaborate on imaging exposure time periods that may allow identification of potential light emitting objects as seen jointly by the vehicles to obtain a higher probability of imaging the infrastructure light source when the LED is active. For example, in one embodiment, the first vehicle 305 and the second vehicle 310 may be localized at a traffic light having one or more LED traffic signals 303, where the vehicles are proximate to one another, and both have a view of the scene. The first vehicle 305 may negotiate an exposure time 320 with the second vehicle 305 via Vehicle-to-Everything (V2X) communication protocols to coordinate or assign a coordinated image exposure timing, temporal offset, exposure length, and/or other parameters with the second vehicle 310. V2X communication is the passing of information from a vehicle to any entity that may affect the vehicle, and vice versa. It is a vehicular communication system that incorporates other more specific types of communication as V2I (vehicle-to-infrastructure), V2N (vehicle-to-network), V2V (vehicle-to-vehicle), V2P (vehicle-to-pedestrian), V2D (vehicle-to-device) and V2G (vehicle-to-grid).

The vehicles 305 and 310 may take image captures 312 and 314, respectively, and share the image captures 312 and 314, respectively, using one or more V2X protocols to determine an accurate and reliable LED status of the LED pulse 302. As shown in FIG. 3, the LED pulses 302 may have a higher probability of being captured in an on state (if the LED illuminates) when two vehicles utilize different and strategically offset exposure times and/or offsets 320 and 325, respectively, such that the joint exposures 330 fall on most or all LED pulses 302. According to embodiments of the present disclosure, the LED flicker mitigation system 407 may correct for LED flicker in the illuminated traffic light, or any other illuminated LED light, to correctly determine the LED light status.

Figure 4:
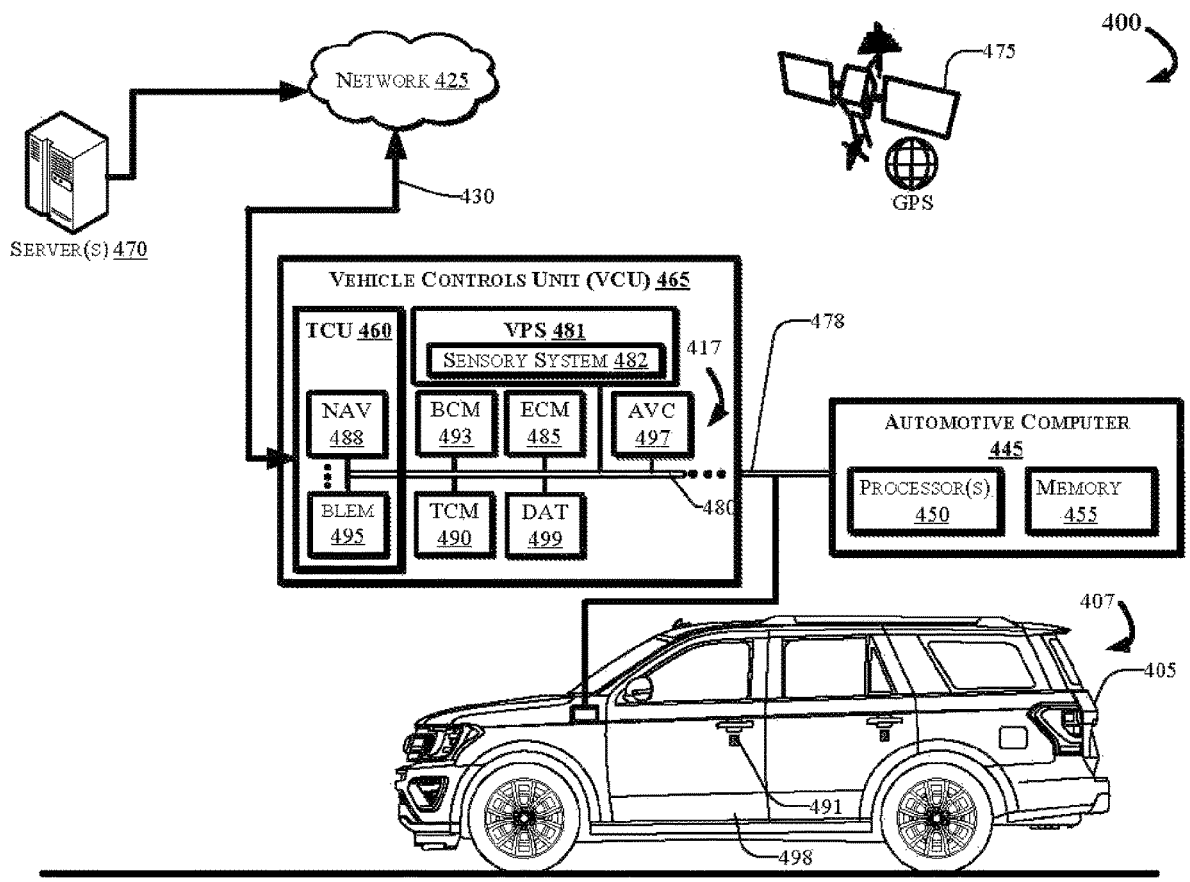
FIG. 4 depicts an example computing environment and a LED flicker mitigation system disposed in an example vehicle in accordance with the present disclosure.

FIG. 4 depicts an example computing environment 400 that can include a vehicle 405. The vehicle 405 may include an automotive computer 445, and a Vehicle Controls Unit (VCU) 465 that can include a plurality of electronic control units (ECUs) 417 disposed in communication with the automotive computer 445.

The vehicle 405 may also receive and/or be in communication with a Global Positioning System (GPS) 475. The GPS 475 may be a satellite system (as depicted in FIG. 4) such as the global navigation satellite system (GLNSS), Galileo, or navigation or other similar system. In other aspects, the GPS 475 may be a terrestrial-based navigation network. In some embodiments, the vehicle 405 may utilize a combination of GPS and Dead Reckoning responsive to determining that a threshold number of satellites are not recognized.

The automotive computer 445 may be or include an electronic vehicle controller, having one or more processor(s) 450 and memory 455. The automotive computer 445 may, in some example embodiments, be disposed in communication with one or more server(s) 470. The server(s) 470 may be part of a cloud-based computing infrastructure, and may be associated with and/or include a Telematics Service Delivery Network (SDN) that provides digital data services to the vehicle 405 and other vehicles (not shown in FIG. 4) that may be part of a vehicle fleet.

Although illustrated as a sport utility, the vehicle 405 may take the form of another passenger or commercial automobile such as, for example, a car, a truck, a high performance vehicle, a crossover vehicle, a van, a minivan, a taxi, a bus, a rickshaw, a jeepney, etc., and may be configured and/or programmed to include various types of automotive drive systems. Example drive systems can include various types of internal combustion engines (ICEs) powertrains having a gasoline, diesel, or natural gas-powered combustion engine with conventional drive components such as, a transmission, a drive shaft, a differential, etc. In another configuration, the vehicle 405 may be configured as an electric vehicle (EV). More particularly, the vehicle 405 may include a battery EV (BEV) drive system, or be configured as a hybrid EV (HEV) having an independent onboard powerplant, a plug-in HEV (PHEV) that includes a HEV powertrain connectable to an external power source, and/or includes a parallel or series hybrid powertrain having a combustion engine powerplant and one or more EV drive systems. HEVs may further include battery and/or supercapacitor banks for power storage, flywheel power storage systems, or other power generation and storage infrastructure. The vehicle 405 may be further configured as a fuel cell vehicle (FCV) that converts liquid or solid fuel to usable power using a fuel cell, (e.g., a hydrogen fuel cell vehicle (HFCV) powertrain, etc.) and/or any combination of these drive systems and components.

Further, the vehicle 405 may be a manually driven vehicle, and/or be configured and/or programmed to operate in a fully autonomous (e.g., driverless) mode (e.g., Level-5 autonomy) or in one or more partial autonomy modes which may include driver assist technologies. Examples of partial autonomy (or driver assist) modes are widely understood in the art as autonomy Levels 1 through 4.

A vehicle having a Level-0 autonomous automation may not include autonomous driving features.

A vehicle having Level-1 autonomy may include a single automated driver assistance feature, such as steering or acceleration assistance. Adaptive cruise control is one such example of a Level-1 autonomous system that includes aspects of both acceleration and steering.

Level-2 autonomy in vehicles may provide driver assist technologies such as partial automation of steering and acceleration functionality, where the automated system(s) are supervised by a human driver that performs non-automated operations such as braking and other controls. In some aspects, with Level-2 autonomous features and greater, a primary user may control the vehicle while the user is inside of the vehicle, or in some example embodiments, from a location remote from the vehicle but within a control zone extending up to several meters from the vehicle while it is in remote operation.

Level-3 autonomy in a vehicle can provide conditional automation and control of driving features. For example, Level-3 vehicle autonomy may include "environmental detection" capabilities, where the autonomous vehicle (AV) can make informed decisions independently from a present driver, such as accelerating past a slow-moving vehicle, while the present driver remains ready to retake control of the vehicle if the system is unable to execute the task.

Level-4 AVs can operate independently from a human driver, but may still include human controls for override operation. Level-4 automation may also enable a self-driving mode responsive to a predefined conditional trigger, such as a road hazard or a system failure.

Level-5 AVs may include fully autonomous vehicle systems that require no human input for operation, and may not include human operational driving controls.

According to embodiments of the present disclosure, the LED flicker mitigation system 407 may be configured and/or programmed to operate with a vehicle having a Level-0 through Level-5 autonomous vehicle controller. Accordingly, the LED flicker mitigation system 407 may provide some aspects of human control to the vehicle 405, when the vehicle is configured as an AV.

The wireless connection(s) 430 are depicted in FIG. 4 as communicating via the one or more network(s) 425, and via one or more wireless connection(s) (not shown in FIG. 4) that can be and/or include direct connection(s) between the vehicle 405 and another vehicle. The wireless connection(s) 433 may include various low-energy protocols including, for example, Bluetooth®, Bluetooth® Low-Energy (BLE®), UWB, Near Field Communication (NFC), or other protocols.

The network(s) 425 illustrate an example communication infrastructure in which the connected devices discussed in various embodiments of this disclosure may communicate. The network(s) 425 may be and/or include the Internet, a private network, public network or other configuration that operates using any one or more known communication protocols such as, for example, transmission control protocol/Internet protocol (TCP/IP), Bluetooth®, BLE®, Wi-Fi based on the Institute of Electrical and Electronics Engineers (IEEE) standard 802.11, UWB, and cellular technologies such as Time Division Multiple Access (TDMA), Code Division Multiple Access (CDMA), High Speed Packet Access (HSPDA), Long-Term Evolution (LTE), Global System for Mobile Communications (GSM), and Fifth Generation (5G), to name a few examples.

The automotive computer 445 may be installed in an engine compartment of the vehicle 405 (or elsewhere in the vehicle 405) and operate as a functional part of the LED flicker mitigation system 407, in accordance with the disclosure. The automotive computer 445 may include one or more processor(s) 450 and a computer-readable memory 455.

The one or more processor(s) 450 may be disposed in communication with one or more memory devices disposed in communication with the respective computing systems (e.g., the memory 455 and/or one or more external databases not shown in FIG. 4). The processor(s) 450 may utilize the memory 455 to store programs in code and/or to store data for performing aspects in accordance with the disclosure. The memory 455 may be a non-transitory computer-readable memory storing a LED flicker mitigation program code. The memory 455 can include any one or a combination of volatile memory elements (e.g., dynamic random access memory (DRAM), synchronous dynamic random-access memory (SDRAM), etc.) and can include any one or more nonvolatile memory elements (e.g., erasable programmable read-only memory (EPROM), flash memory, electronically erasable programmable read-only memory (EEPROM), programmable read-only memory (PROM), etc.

The VCU 465 may share a power bus 478 with the automotive computer 445, and may be configured and/or programmed to coordinate the data between vehicle 405 systems, connected servers (e.g., the server(s) 470), and other vehicles (not shown in FIG. 4) operating as part of a vehicle fleet. The VCU 465 can include or communicate with any combination of the ECUs 417, such as, for example, a Body Control Module (BCM) 493, an Engine Control Module (ECM) 485, a Transmission Control Module (TCM) 490, the TCU 460, a Driver Assistances Technologies (DAT) controller 499, an AV Controller (AVC) 497, etc. The VCU 465 may further include and/or communicate with a Vehicle Perception System (VPS) 481, having connectivity with and/or control of one or more vehicle sensory system(s) 482.

The TCU 460 can be configured and/or programmed to provide vehicle connectivity to wireless computing systems onboard and offboard the vehicle 405, and may include a Navigation (NAV) receiver 488 for receiving and processing a GPS signal from the GPS 475, a BLE® Module (BLEM) 495, a Wi-Fi transceiver, a UWB transceiver, and/or other wireless transceivers (not shown in FIG. 4) that may be configurable for wireless communication between the vehicle 405 and other systems, computers, and modules. The TCU 460 may be disposed in communication with the ECUs 417 by way of a bus 480. In some aspects, the TCU 460 may retrieve data and send data as a node in a CAN bus.

The BLEM 495 may establish wireless communication using Bluetooth® and BLE® communication protocols by broadcasting and/or listening for broadcasts of small advertising packets, and establishing connections with responsive devices that are configured according to embodiments described herein. For example, the BLEM 495 may include Generic Attribute Profile (GATT) device connectivity for client devices that respond to or initiate GATT commands and requests.

The bus 480 may be configured as a Controller Area Network (CAN) bus organized with a multi-master serial bus standard for connecting two or more of the ECUs 417 as nodes using a message-based protocol that can be configured and/or programmed to allow the ECUs 417 to communicate with each other. The bus 480 may be or include a high speed CAN (which may have bit speeds up to 1 Mb/s on CAN, 5 Mb/s on CAN Flexible Data Rate (CAN FD)), and can include a low-speed or fault tolerant CAN (up to 125 Kbps), which may, in some configurations, use a linear bus configuration. In some aspects, the ECUs 417 may communicate with a host computer (e.g., the automotive computer 445, the LED flicker mitigation system 407, and/or the server(s) 470, etc.), and may also communicate with one another without the necessity of a host computer. The bus 480 may connect the ECUs 417 with the automotive computer 445 such that the automotive computer 445 may retrieve information from, send information to, and otherwise interact with the ECUs 417 to perform steps described according to embodiments of the present disclosure. The bus 480 may connect CAN bus nodes (e.g., the ECUs 417) to each other through a two-wire bus, which may be a twisted pair having a nominal characteristic impedance. The bus 480 may also be accomplished using other communication protocol solutions, such as Media Oriented Systems Transport (MOST) or Ethernet. In other aspects, the bus 480 may be a wireless intra-vehicle bus.

The VCU 465 may control various loads directly via the bus 480 communication or implement such control in conjunction with the BCM 493. The ECUs 417 described with respect to the VCU 465 are provided for example purposes only, and are not intended to be limiting or exclusive. Control and/or communication with other control modules not shown in FIG. 4 is possible, and such control is contemplated.

In an example embodiment, the ECUs 417 may control aspects of vehicle operation and communication using inputs from human drivers, inputs from an autonomous vehicle controller, the LED flicker mitigation system 407, and/or via wireless signal inputs received via the wireless connection(s) 433 from other connected devices such as the those associated with another vehicle using a V2X communication protocol. The ECUs 417, when configured as nodes in the bus 480, may each include a central processing unit (CPU), a CAN controller, and/or a transceiver (not shown in FIG. 4).

The BCM 493 generally includes integration of sensors, vehicle performance indicators, and variable reactors associated with vehicle systems, and may include processor-based power distribution circuitry that can control functions associated with the vehicle body such as lights, windows, security, door locks and access control, and various comfort controls. The BCM 493 may also operate as a gateway for bus and network interfaces to interact with remote ECUs (not shown in FIG. 4).

The BCM 493 may coordinate any one or more functions from a wide range of vehicle functionality, including energy management systems, alarms, vehicle immobilizers, driver and rider access authorization systems, Phone-as-a-Key (PaaK) systems, driver assistance systems, AV control systems, power windows, doors, actuators, and other functionality, etc. The BCM 493 may be configured for vehicle energy management, exterior lighting control, wiper functionality, power window and door functionality, heating ventilation and air conditioning systems, and driver integration systems. In other aspects, the BCM 493 may control auxiliary equipment functionality, and/or be responsible for integration of such functionality.

In some aspects, the vehicle 405 may include one or more Door Access Panels (DAPs) 491 disposed on exterior door surface(s) of vehicle door(s) 498, and connected with a DAP controller (not shown in FIG. 4). The user interface may be included as part of a Door Access Panel (DAP) 491, a wireless keypad, included as a part of the mobile device (not shown in FIG. 4), or included as part of another interface. The DAP 491, which may operate and/or communicate with another of the ECUs 417, can include and/or connect with an interface with which a ridehail passenger may input identification credentials and receive information from the system. In one aspect, the interface may be or include a DAP 491 disposed on a vehicle door 498, and can include an interface device from which the user can interact with the system by selecting their unique identifier from a list, and by entering personal identification numbers (PINs) and other non-personally identifying information. In some embodiments, the interface may be a mobile device, a keypad, a wireless or wired input device, a vehicle infotainment system, and/or the like. Accordingly, it should be appreciated that, although a DAP is described with respect to embodiments herein, the interface may alternatively be one or more other types of interfaces described above.

The DAT controller 499 may provide Level-1 through Level-3 automated driving and driver assistance functionality that can include, for example, active parking assistance, trailer backup assistance, adaptive cruise control, lane keeping, and/or driver status monitoring, among other features. The DAT controller 499 may also provide aspects of user and environmental inputs usable for user authentication. Authentication features may include, for example, biometric authentication and recognition.

The DAT controller 499 can obtain input information via the vehicle sensory system(s) 482, which may include sensors disposed on the vehicle interior and/or exterior (sensors not shown in FIG. 4). The DAT controller 499 may receive the sensor information associated with driver functions, vehicle functions, and environmental inputs, and other information. The DAT controller 499 may characterize the sensor information for identification of biometric markers stored in a secure biometric data vault (not shown in FIG. 4) onboard the vehicle 405 and/or via the server(s) 470.

In other aspects, the DAT controller 499 may also be configured and/or programmed to control Level-1 and/or Level-2 driver assistance when the vehicle 405 includes Level-1 or Level-2 autonomous vehicle driving features. The DAT controller 499 may connect with and/or include a Vehicle Perception System (VPS) 481, which may include internal and external sensory systems (collectively referred to as sensory systems 481). The vehicle sensory systems 482 may be configured and/or programmed to obtain sensor data usable for biometric authentication, and for performing driver assistances operations such as, for example, active parking, trailer backup assistances, adaptive cruise control and lane keeping, driver status monitoring, and/or other features.

The computing system architecture of the automotive computer 445, VCU 465, and/or the LED flicker mitigation system 407 may omit certain computing modules. It should be readily understood that the computing environment depicted in FIG. 4 is an example of a possible implementation according to the present disclosure, and thus, it should not be considered limiting or exclusive.

Figure 5:
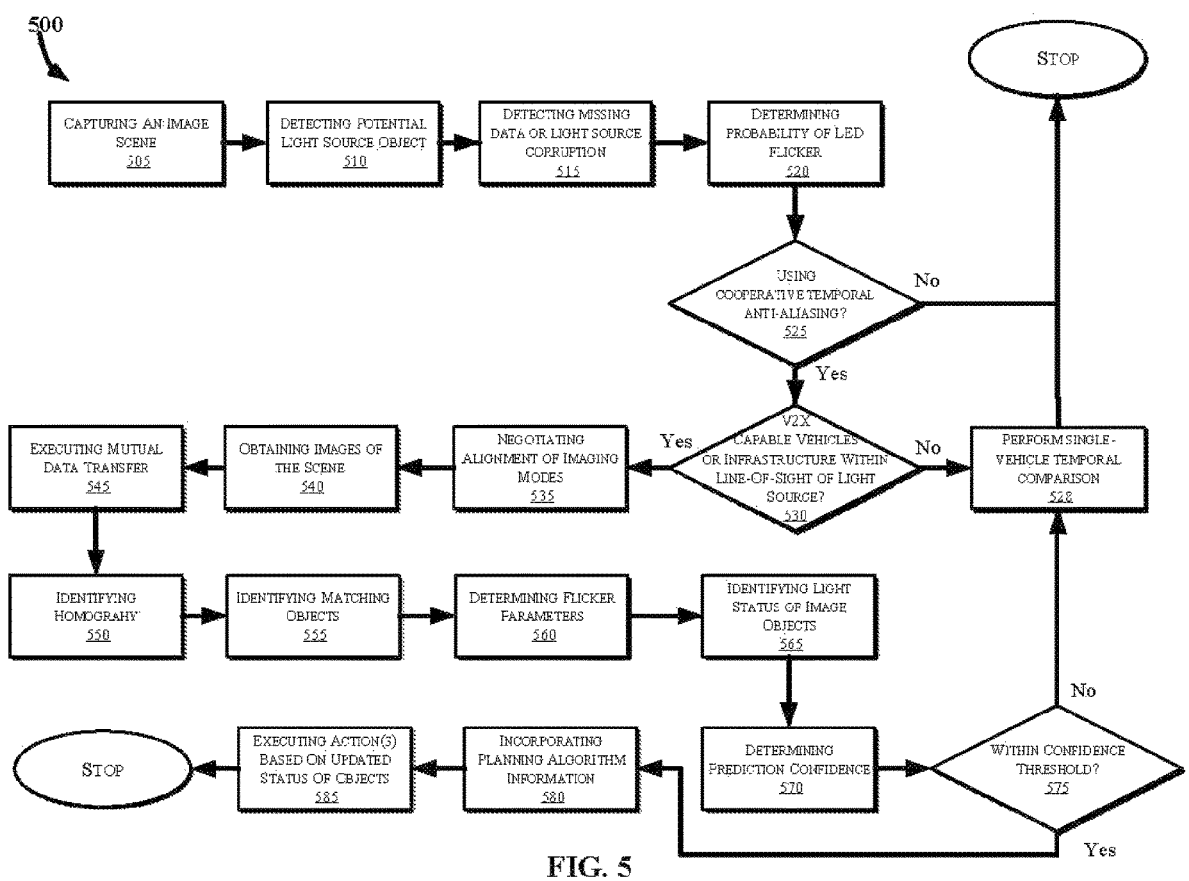
FIG. 5 is a flow diagram of an example method for mitigating LED flicker using the system of FIG. 4 in accordance with embodiments described herein.

FIG. 5 is a flow diagram of an example method 500 for mitigating LED flicker in a vehicle vision system, according to the present disclosure. FIG. 5 may be described with continued reference to prior figures, including FIGS. 1-4. The following process is exemplary and not confined to the steps described hereafter. Moreover, alternative embodiments may include more or less steps as shown or described herein, and may include these steps in a different order than the order described in the following example embodiments.

With reference to step 505, the method 500 may commence with capturing an image scene. This step may include obtaining, via the vehicle perception system one or more image captures. Accordingly, a system processor may receive the image captures of the scene, where the image captures include images of an external LED light source that may be, for example, a light signal, a sign, and/or the like.

At step 510, the method 500 may further include detecting a potential light source object. This step may include performing one or more image processing techniques such as, for example, object detection, instance segmentation, and semantic segmentation or another technique known in the art of image processing.

At step 515, the method 500 may further include detecting missing data or a corrupted light source identified in the image captures. This step may include characterizing objects in the plurality of image captures that may be light sources, and building a static light source object history associated with a single image capture, and tracking that light source object through a series of successive image captures to build a dynamic illumination history of that light source. In one aspect, flashing light source objects, light source objects that may be partly visible in some frames, and clearly visible in other frames, light source objects that may appear non-operational (completely off-state), objects that may appear to show intermittent on-off behavior, and/or other artifacts identified in the image captures may be indicative of missing data or light source corruption and/or prior knowledge from HD-maps.

At step 520, the method 500 may further include determining the probability of LED flicker. This step may include identifying homography in the image captures, and determining that the identified homography exceeds a confidence threshold indicative of a corruption of the LED light source in the image capture. In some aspects, this determination may be based on a relative, numerically-weighted comparison using characteristics that may include current exposure time, current weather patterns or other atmospheric conditions (e.g., a sunny day vs. a cloudy day), and other factors such as, for example, prior mapping of PWM frequencies of street light. For example, during an overcast day, a nominal exposure time for a camera in the VPS may be substantially longer in duration as compared with a bright sunny day. A relatively long duration image exposure may increase a probability associated with obtaining a correct light state for an LED light source object in the image capture(s). The higher probability may be due to the LED being read correctly as being ON in some or all image frames. By comparison, on a sunny day the exposure time may be relatively short such that the image is not over-exposed and light saturated.

In another aspect, determining the probability of LED flicker may include identifying, using the VPS, a moving vehicle with an ambiguous turn signal, where the moving vehicle has a light observed as being intermittent in the image captures.

In yet another example, determining the probability of LED flicker may include identifying a light source object normally associated as a source of light (e.g., a traffic light, vehicle running lights, illuminated traffic control signage, etc.) using semantic segmentation or another method as described in step 510), and determining that the detected light source object is not a source of observed light in the image captures or that the message or feature is corrupted, or the message or feature varies over time. Based on identification of a lack of light source signal in an anticipated light source object, the LED flicker mitigation system may numerically determine a weighted probability value indicative of whether the non-operational traffic light indicates a detected corruption of the LED light source in the image captures. In another aspect, a traffic light may appear to be non-operational or dim (due to high dynamic range negative interactions), which may suggest that LED light pulses are being missed during camera exposure or that rows are missing or the intensity if varying sinusoidally. In short, indicia of corruption of the light source object may include a flashing light effect, a partially visible light effect, and a no light effect, among other possible indicia.

At step 525, the method 500 may further include determining whether the flicker mitigation system may use cooperative temporal anti-aliasing to mitigate LED flicker based on the probability of LED flicker (step 520). Responsive to determining that the threshold is not met, the process stops. The threshold determination step may mitigate false positives for LED light source corruption.

Responsive to determining that the identified homography exceeds a confidence threshold, the method may include determining, at step 530, whether V2X capable vehicles or infrastructure are within line-of-sight of the light source object. This step may include determining whether an infrastructure node is available that may provide a secondary information source, such as a smart light signal system that broadcasts light state statuses to vehicles configured with V2X systems. In another aspect, this step may include determining whether an another V2X capable vehicle is proximate and available that may provide a secondary information source. The embodiment described with respect to FIG. 4 illustrates one such example.

At step 535, the method 500 may further include negotiating alignment of imaging modes between two or more V2X enabled vehicles. This step may include determining, via the processor, offsetting values for exposure times, adjusting and/or determining exposure length times, and/or determining other camera parameters that may minimize loss in imaging data from the first vehicle and other V2X enabled vehicles proximate to the initiating vehicle. In other aspects, this step may include selecting a multi-exposure imaging mode for each available camera of a plurality of cameras associated with the VPS and the imaging systems of available V2X enabled vehicles nearby. Different security models may require hardware signed images (e.g. images with attached cryptographic data which is signed by an electronic component(s) to confirm the authenticity of the image data) to validate the object classification on the basis of a security model with a centrally signed V2X crypto key.

This may be executed by sending and receiving a camera inventory to all wirelessly-connected vehicles proximate to the first vehicle, selecting a master node among vehicles to compile the camera inventory, querying all vehicles for camera specifications and capabilities associated with respective cameras, generating a lookup table that includes all available cameras and capabilities, (e.g. mounting location, orientation, field of view, intrinsic and extrinsic camera matrix, resolution, etc.) and assigning each individual camera to obtain one or more collaborative image captures with varying exposure times, and reporting the image captures to the master V2X node. Furthermore, a static and dynamic occupancy map or voxel matrix may be constructed to determine obstruction of each respective camera for each corresponding V2X node. This may then allow the maters node to filter present and future acceptable V2X enabled vehicles with sufficiently suitable imaging capabilities. Accordingly, the master V2X node may create a virtual multi-exposure imaging solution (e.g., data fusion) based on the collaborative images or temporal image sequence, inclusive of following shutter time delay in CMOS cameras. The timing negotiation and image set processing may occur continuously or be pre-negotiated over a predetermined or negotiated time frame.

The timing negotiation step may include negotiating one or more iterative search patterns to identify LED output over a number of frequencies and offsets. A multi-agent optimization algorithm may be utilized for solving the resource-constrained project scheduling problem. Furthermore, a cost function may be used in the optimization algorithm that takes into account the mutual benefit of LED flicker removal with the individual cost of operating camera imaging at an operational parameter that may not be optimal for the host vehicle. Moreover, the proximate V2X enabled vehicles may keep and update real-time knowledge of local grid AC frequencies when searching for LED pulses or known PWM frequencies of specific manufacturers (e.g. make, model, and production year of a given vehicle headlights). In some aspect, power grid frequency is not always stable, this can be monitored similar to what is done with micro-grid In another aspect, instead of selecting a master V2X node, the data and fusion processing may be distributed across multiple proximate vehicles\infrastructure nodes communicating via V2X.

At step 540, the method may include obtaining images of the image scene using vehicle vision systems disposed on the (first) vehicle, other V2X enabled vehicles, and in some embodiments, using one or more infrastructure nodes.

At step 545, the method 500 may include executing mutual data transfer. In some aspects, this step may further include performing one or more data authentication steps that may prevent malicious proximate actors from sending falsified data.

At step 550, the method 500 may further include identifying homography between two images and sensor fusion. This step may include utilizing structure from motion and/or multi-view stereo imaging cameras for image rectification and object matching. In cases of sensor fusion, the LED flicker mitigation system may combine multi-exposure high dynamic range image captures having multiple length.

In other aspects, this step may include utilizing three-dimensional (3D) depth output from motion and/or multi-view stereo imaging cameras, and localizing the light source object detected in the image captures (Step 510). The homography identification step 550 may further include aligning the multiple image captures, and fusing the images to improve individual sensor quality. In some instances, the sensor fusion step may take into account the LED flicker phenomena from what is essentially a higher speed camera, and provide a relative weight to those images. For example, higher speed cameras may be disposed to greater numbers of aliasing errors as demonstrated in FIGS. 1 and 2.

Image fusion may include application of one or more image processing techniques known in the art of digital signal processing. For example, the LED flicker mitigation system may use a pixel-level image fusion technique, which may be disposed to spatial domain processing or transform domain processing, one or more feature-level image fusion techniques that utilize algorithms that segment the images into contiguous regions and fuse the regions using the respective regional properties, and/or a decision-level image fusion technique combining image descriptions to fuse the regions. In one example embodiment, the system may fuse the images to reconstruct a "human" view of a given intensity given the PWM characteristics and output intensity while on the duty cycle for a non-binary illumination system. Such an approach may be beneficial for complex turn signal light interpretation, or start up/down illumination sequences for ADAS and AV target vehicle future trajectory prediction scenarios.

Pixel-level image fusion techniques may include applying one or more analysis methods that may include averaging, an image mosaicking technique, a Brovey method, Principal Component Analysis (PCA), wavelet transform, and/or intensity hue saturation (IHS) transforms. The actual computer vision workflow can vary based on system configuration. In one example, the system may extend a bounding box around the light in question, perform feature descriptors and homography, and warp the image to obtain pixel to pixel matching. The system may then compare pixel intensity of the active regions over a predetermined time frame.

In other aspects, feature-level image fusion techniques may include the use of feature descriptors, a neural network, application of region-based semantic segmentation, K-means clustering, and/or similarity matching to content-based image retrieval.

Decision-level image fusion techniques may include fusion based on unsupervised and Fuzzy C-Means (FCM) clustering techniques, digital signal processing of pixel level fusion of illuminator regions/pixels in the temporal image stack, fusion based on support vector machine, and fusion based on information level in respective regions of images. Other techniques for image fusion are possible, and such methods are contemplated.

At step 555, the method 500 may further include identifying matching objects in the image captures. This step may include use of classical or neural network based methods, which may include object detection bound boxes and semantic segmentation.

At step 560, the method 500 may further include determining flicker parameters, which can include identifying the underlying metric of estimation, determining the use of a Bayesian framework in the detection algorithm, selecting the statistics of probability of detection of the signal given the temporal regions not sampled, etc.

At step 565, the method 500 may include determining a flicker status of light source objects in the image captures based on the flicker parameters. In one aspect, the system may estimate frequency and a temporal offset of light source objects to determine the current status of respective light sources. For example, one light source may be a red traffic light, and sub-segmentation down to segment and pixel level estimations.

At step 570, the method 500 may further include determining a confidence value for light source status in individual image capture frames, and collectively, across multiple proximate V2X vehicles and the entire image set. In some aspects, the system may take into account ambient lighting noise factors. For example, if a first vehicle (car A) perceived changes between 10% and 50%, a second vehicle (car B) may perceive changes between 40% and 50% illumination due to glare effects. Stated another way, this step can include determining whether a non-illuminated light source, blinking light source, or another phenomenon is indicative of erroneous and corrupted data.

In another example, using the example of FIG. 3, if the first vehicle detects the traffic light is off in two frames and the second vehicle detects the traffic light as being on in the second of two frames, such coordinated information may be indicative of a false positive detection, with a high relative probability of corruption of the LED light source based on an object static illumination history. In some aspects, the false positive detection risk may be estimated at 5%. If this risk is above some given threshold for safety (0.01%, for example) to prevent false braking for ghost red lights, this step may further include obtaining a second (or additional) image capture frames using one vehicle, or using coordinated techniques described herein with multiple vehicles. The vehicle(s) may negotiate temporal prediction targets for the operational frequency of the light, and determine the temporal offsets to be used in respective image captures based on the operational frequency target until the risk estimate falls below the safety threshold.

At step 575, the method 500 may further include determining whether the light status is within the confidence threshold. Responsive to determining that the confidence value is below the threshold, the system may perform single vehicle temporal comparison steps (Step 528).

At step 580, responsive to determining that the confidence threshold is met, the method 500 may further include incorporating planning algorithm information. This step may include correcting LED flicker effects that may corrupt multi-exposure high dynamic range (HDR) imaging. In one embodiment, vehicle image capture exposure timing may be set to a prior determined frequency/offset when another V2X enabled vehicle is not available. In other aspects, the LED flicker mitigation system may incorporate knowledge obtained from prior trips through a given neighborhood by, for example, uploading light frequency information to a centralized map server, including, for example, a temporal offset value.

At step 585, the method 500 may include executing one or more vehicle control actions based on an updated status of the light source objects. For example, the vehicle may continue moving forward through a light or stop at a light based on the confirmed LED on state. In one example, the vehicle may continue without stopping after confirming, within a threshold of confidence, that an approaching light signal is indeed green and not a non-functioning light (which, in some regional driving rules, requires the vehicle to stop at the intersection and treat a non-functioning light as a four-way stop).

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method for mitigating light emitting diode (LED) flicker in a first vehicle, the method comprising:
   receiving a first image capture of a scene, the first image capture comprising an LED light source;
   detecting a corruption of the LED light source in the first image capture;
   receiving, from a second vehicle, second image capture information associated with a second image capture;
   identifying homography based on the first image capture and the second image capture information;
   determining a light status of an object associated with the LED light source: and controlling the first vehicle based on the light status of the object.

2. The method according to claim 1, further comprising:
   determining that the identified homography exceeds a confidence threshold; and
   controlling the first vehicle based on the identified homography.

3. The method according to claim 1, wherein detecting the corruption of the LED light source in the first image capture comprises:
   detecting the corruption of the LED light source based on object static illumination history.

4. The method according to claim 1, wherein detecting the corruption of the LED light source in the first image capture comprises:
   detecting the corruption of the LED light source based on object dynamic illumination history.

5. The method according to claim 1, wherein the corruption comprises a low light condition associated with one or more of:
   a flashing light effect;
   a partially visible light effect; or
   a no light effect.

6. The method according to claim 1, further comprising:
receiving, from an infrastructure device, an infrastructure message comprising an infrastructure light status; and
detecting the corruption of the LED light source in the first image capture further based on the infrastructure message.

7. The method according to claim 1, wherein identifying homography comprises:
identifying the homography based on the first image capture, the second image capture, and sensor information.

8. The method according to claim 7, further comprising:
performing sensor fusion on a plurality of multi-exposure high dynamic range image captures of varying lengths and varying exposures; and
combining the multiple length varying exposures.

9. The method according to claim 8, wherein the plurality of multi-exposure high dynamic range image captures includes the first image and the second image.

10. The method according to claim 1, wherein determining the light status of the object comprises one or more of:
estimating a frequency of the LED light source; and
determining a temporal offset of the LED light source and a second light source.

11. A system, comprising:
a vehicle processor; and
a memory for storing executable instructions, the processor programmed to execute the instructions to:
receive a first image capture of a scene, the first image capture comprising an LED light source;
detect a corruption of the LED light source in the first image capture;
receive, from a second vehicle, second image capture information associated with a second image capture obtained by the second vehicle;
identify homography based on the first image capture and the second image capture information;
determine a light status of an object associated with the LED light source; and
control a first vehicle based on the light status of the object.

12. The system according to claim 11, wherein the processor is further programmed to:
determine that the identified homography exceeds a confidence threshold; and
control the first vehicle based on the identified homography.

13. The system according to claim 11, wherein the processor is further programmed to detect the corruption of the LED light source in the first image capture by executing the instructions to:
detect the corruption of the LED light source based on object static illumination history.

14. The system according to claim 11, wherein the processor is further programmed to detect the corruption of the LED light source in the first image capture by executing the instructions to:
detect the corruption of the LED light source based on object dynamic illumination history.

15. The system according to claim 11, wherein the corruption comprises a low light condition associated with one or more of:
a flashing light effect;
a partially visible light effect; or
a no light effect.

16. The system according to claim 11, wherein the processor is further programmed to execute the instructions to:
receive, from an infrastructure device, an infrastructure message comprising an infrastructure light status; and
detect the corruption of the LED light source in the first image capture further based on the infrastructure message.

17. The system according to claim 11, wherein the processor is further programmed to identify the homography by executing the instructions to:
identify the homography based on the first image capture, the second image capture, and vehicle sensor information.

18. The system according to claim 17, wherein the processor is further programmed to execute the instructions to:
perform sensor fusion on a plurality of multi-exposure high dynamic range image captures of varying lengths and varying exposures; and
combine the multiple length varying exposures.

19. The system according to claim 18, wherein the plurality of multi-exposure high dynamic range image captures includes the first image capture from the first vehicle and the second image capture from the second vehicle.

20. A non-transitory computer-readable storage medium in a vehicle controller comprising a processor, the computer-readable storage medium having instructions stored thereupon which, when executed by a processor, cause the processor to:
detect a corruption of the LED light source in the first image capture;
receive, from a second vehicle, second image capture information associated with a second image capture obtained by the second vehicle;
identify homography based on the first image capture and the second image capture information;
determine a light status of an object associated with the LED light source; and
control a first vehicle based on the light status of the object.

* * * * *